(12) United States Patent
Tanaka et al.

(10) Patent No.: US 10,558,218 B2
(45) Date of Patent: Feb. 11, 2020

(54) VEHICLE SURROUNDINGS MONITORING APPARATUS, MONITORING SYSTEM, REMOTE MONITORING APPARATUS, AND MONITORING METHOD

(71) Applicant: FUJITSU TEN LIMITED, Kobe-shi, Hyogo (JP)

(72) Inventors: Shinichi Tanaka, Kobe (JP); Ayumi Shigematsu, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 272 days.

(21) Appl. No.: 15/414,225

(22) Filed: Jan. 24, 2017

(65) Prior Publication Data
US 2017/0220041 A1  Aug. 3, 2017

(30) Foreign Application Priority Data

Jan. 28, 2016 (JP) ................. 2016-014699

(51) Int. Cl.
| | | |
|---|---|---|
| *G05D 1/00* | (2006.01) | |
| *H04W 4/40* | (2018.01) | |
| *G08G 5/00* | (2006.01) | |
| *B64C 39/02* | (2006.01) | |
| *H04B 1/3822* | (2015.01) | |
| *H04B 7/185* | (2006.01) | |

(52) U.S. Cl.
CPC ......... *G05D 1/0094* (2013.01); *B64C 39/024* (2013.01); *G08G 5/0013* (2013.01); *G08G 5/0069* (2013.01); *G08G 5/0086* (2013.01); *H04B 1/3822* (2013.01); *H04B 7/18506* (2013.01); *H04W 4/40* (2018.02); *B64C 2201/042* (2013.01); *B64C 2201/123* (2013.01); *B64C 2201/127* (2013.01); *B64C 2201/145* (2013.01)

(58) Field of Classification Search
CPC ........ B64C 2201/042; B64C 2201/123; B64C 2201/127; B64C 2201/145; B64C 39/024; B64D 47/08; B64F 1/362; G01S 19/13; G05D 1/0038; G05D 1/0094; H04B 1/3822; H04B 7/18506; H04W 4/046
See application file for complete search history.

(56) References Cited

U.S. PATENT DOCUMENTS

| | | | | |
|---|---|---|---|---|
| 10,145,684 | B1 * | 12/2018 | Tofte .................. | G06Q 40/08 |
| 2015/0353206 | A1 * | 12/2015 | Wang .................. | B64F 1/00 |
| | | | | 244/114 R |

FOREIGN PATENT DOCUMENTS

| | | |
|---|---|---|
| JP | H10-42282 A | 2/1998 |
| JP | 2004-101616 A | 4/2004 |

(Continued)

*Primary Examiner* — Charles J Han
(74) *Attorney, Agent, or Firm* — Oliff PLC

(57) ABSTRACT

To allow acquisition of information corresponding to running conditions of a vehicle and presentation of the information to a passenger. A vehicle surroundings monitoring apparatus acquires information on vehicle surroundings while floating a floating body equipped with a sensor including at least an image-taking apparatus in the vehicle surroundings and presents the information to a passenger. The vehicle surroundings monitoring apparatus includes processing means for controlling at least one of a method for acquiring the information on the vehicle surroundings and a method for presenting the information to a passenger in accordance with running conditions of a vehicle.

13 Claims, 13 Drawing Sheets

(56) References Cited

FOREIGN PATENT DOCUMENTS

| | | | |
|---|---|---|---|
| JP | 2004-291805 A | | 10/2004 |
| JP | 2006-082774 A | | 3/2006 |
| JP | 2006-180326 A | | 7/2006 |
| JP | 2006180326 A | * | 7/2006 |
| JP | 2007-78235 A | | 3/2007 |
| JP | 2008-074275 A | | 4/2008 |
| JP | 2008074275 A | * | 4/2008 |
| JP | 2010-250478 A | | 11/2010 |
| JP | 2010-267052 A | | 11/2010 |
| JP | 2010250478 A | * | 11/2010 |
| JP | 2011-108084 A | | 6/2011 |
| JP | 2015-113100 A | | 6/2015 |
| JP | 5819555 B1 | | 11/2015 |

* cited by examiner

VEHICLE SURROUNDINGS MONITORING APPARATUS, MONITORING SYSTEM, REMOTE MONITORING APPARATUS, AND MONITORING METHOD

CROSS-REFERENCE TO RELATED APPLICATIONS

This application is based upon and claims the benefit of prior Japanese Patent Application No. 2016-014699 filed on Jan. 28, 2016, the entire contents of which are incorporated herein by reference.

FIELD

The present invention relates to a vehicle surroundings monitoring apparatus, a monitoring system, a remote monitoring apparatus, and a monitoring method.

BACKGROUND

A technique has been proposed for shooting an image of the surroundings and front of a vehicle from above by an image-taking apparatus equipped on a flying object or the like and displaying the image on a display being looked at by a driver (see, for example, Patent document 1). The driver can grasp, for example, the conditions of a road surface in front, the conditions of a traffic light, the conditions of an intersection, and traffic conditions by viewing the shot image displayed on the display.

Use of a flying object, such as a remote control or autonomous quadcopter or multicopter called a "drone," for purposes other than a recreational purpose has been under consideration in recent years. For example, application of a drone to monitoring, measurement, transportation of goods, weapons, and the like is under consideration.

[Patent document 1] Japanese Patent Laid-Open No. 2006-180326

[Patent document 2] Japanese Patent Laid-Open No. 2008-74275

[Patent document 3] Japanese Patent Laid-Open No. 2010-250478

Technical Problem

If a drone is used to assist in driving of a vehicle, application of the conventional technique is conceivable. However, acquisition of diverse information corresponding to the running status of a vehicle and presentation of the information to a passenger have been impossible.

Solution to Problem

One aspect of the disclosed technique is exemplified by a vehicle surroundings monitoring apparatus. That is, the vehicle surroundings monitoring apparatus acquires information on vehicle surroundings while floating a floating body equipped with a sensor including at least an usage-taking apparatus in the vehicle surroundings and presents the information to a passenger. The vehicle surroundings monitoring apparatus is marked by inclusion of processing means for controlling at least one of a method for acquiring the information on the vehicle surroundings and a method for presenting the information to the passenger in accordance with running conditions of a vehicle. The present invention allows acquirement and presentation of diverse information corresponding to the running status of a vehicle and allows more practical and useful driving assistance using a drone.

Advantageous Effect of Invention

The vehicle surroundings monitoring apparatus allows acquisition of information corresponding to running conditions of a vehicle and presentation of the information to a passenger.

DESCRIPTION OF EMBODIMENTS

A vehicle surroundings monitoring apparatus according to one embodiment will be described below with reference to the drawings. A configuration in the embodiment below is merely illustrative, and the vehicle surroundings monitoring apparatus is not limited to the configuration of the embodiment.

First Embodiment

System Configuration

Figure 1:
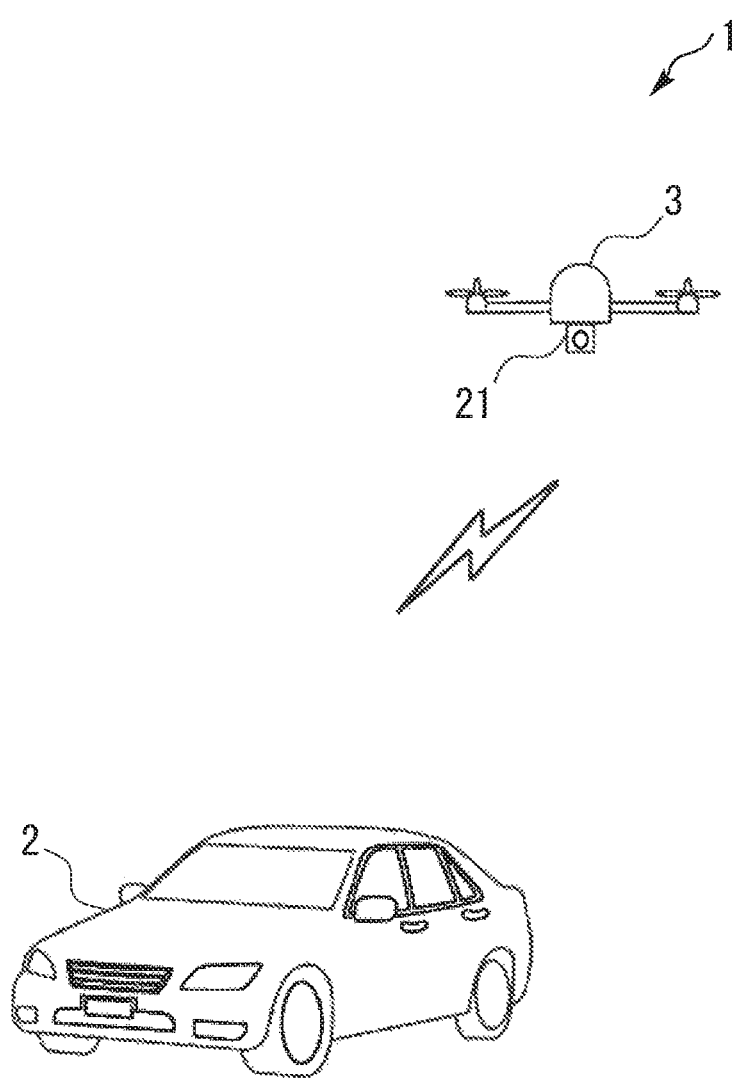
FIG. 1 is a configuration view illustrating one example of a monitoring system.

FIG. 1 is a configuration view illustrating one example of a monitoring system 1 according to the present embodiment. The monitoring system 1 includes a vehicle 2 which is equipped with a vehicle surroundings monitoring apparatus and a flying object 3 which is equipped with a floating type remote monitoring apparatus. The flying object 3 is, for example, a flying object, such as a drone, which is capable of flying autonomously under control of the floating type remote monitoring apparatus. The flying object 3 flies, for example, while floating in the vicinity of the vehicle 2. The flying object 3 is equipped with an image-taking apparatus 21 which is connected to the floating type remote monitoring apparatus. The vehicle surroundings monitoring apparatus and the floating type remote monitoring apparatus are each, for example, a computer having a wireless communication module. The vehicle surroundings monitoring apparatus and the floating type remote monitoring apparatus are connected via wireless communication prescribed in the wireless communication modules. Note that a plurality of flying objects 3 equipped with floating type remote monitoring apparatuses can be connected to the vehicle surroundings monitoring apparatus equipped on the vehicle 2.

The vehicle surroundings monitoring apparatus acquires information about running conditions of the vehicle 2. The information about the running conditions includes, for example, pieces of information, such as a running speed, an acceleration rate associated with acceleration or deceleration, a traveling direction, and a yaw rate which depends on steering operation of the vehicle 2. The information way include, for example, pieces of information, such as a position specified through operation of a turn signal lever, a position specified through operation of a shift lever, an idle reduction instruction or status, airbag deployment, and shock detection (a change in the acceleration rate of a fixed value or more). Alternatively, the information may include, for example, positional information (hereinafter also referred to as GPS information), such as longitude and latitude of the vehicle 2, based on a global positioning system (GPS) signal and geographic information. The vehicle surroundings monitoring apparatus transmits the information acquired from the vehicle 2 to the floating type remote monitoring apparatus.

The floating type remote monitoring apparatus receives the information transmitted from the vehicle surroundings monitoring apparatus via wireless communication. The floating type remote monitoring apparatus determines a running status or a change in behavior of the vehicle 2 on the basis of the information. The floating type remote monitoring apparatus performs flight control of the flying object 3 and shooting control of the image-taking apparatus 21 in a manner corresponding to the running status or a change in behavior of the vehicle 2.

For example, if the running speed of the vehicle 2 is high, the floating type remote monitoring apparatus varies a flight speed (traveling speed) of the flying object 3, changes a focal length of the image-taking apparatus 21 to suit the varied flight speed, and shoots the distance along a traveling direction. For example, if the running speed of the vehicle 2 is low, the floating type remote monitoring apparatus changes the flight speed (traveling speed) of the flying object 3, changes an angle of view of the image-taking apparatus 21 to suit the varied flight speed, and shoots vehicle vicinity. A shot image shot in a manner corresponding to the running status or a change in behavior of the vehicle 2 is transmitted to the vehicle surroundings monitoring apparatus by the floating type remote monitoring apparatus and is displayed on a displayed being looked at by a driver of the vehicle 2 or a fellow passenger. The driver or fellow passenger is capable of collecting information corresponding to the running conditions of the vehicle 2 by viewing the shot image displayed on the display.

For example, if the running speed is high, the driver or fellow passenger is capable of collecting information on road conditions in the distance along the traveling direction. The driver or fellow passenger can grasp road conditions in an intended course early. If the running speed is low, the driver or fellow passenger is capable of, for example, collecting information on conditions of widespread environs of the vehicle 2. The driver or fellow passenger can accurately grasp the presence of an obstacle, a pedestrian, or the like by monitoring the conditions of the widespread environs of the vehicle 2. The monitoring system 1 allows control of an area targeted for information collection based on the running conditions.

For example, the floating type remote monitoring apparatus determines, from received information about the running conditions of the vehicle 2, that the traveling direction of the vehicle 2 changes. Acceleration or deceleration of the running vehicle 2 can be determined from, for example, a change in a vehicle speed or the acceleration rate. Additionally, a change in the traveling direction of the running vehicle 2 can be determined from, for example, a change in a value indicative of the yaw rate or the traveling direction. Similarly, for example, a near-future change in the traveling direction of the running vehicle 2 to a rightward direction or a leftward direction can be predicted from the specified position of the turn signal lever. For example, forward or rearward movement in the traveling direction of the vehicle 2 can be predicted from the specified position of the shift lever. The floating type remote monitoring apparatus changes the traveling direction of the flying object 3 to the changing traveling direction of the vehicle 2 and changes a shooting direction of the image-taking apparatus 21. For example, if the vehicle 2 turns to the right, the floating type remote monitoring apparatus swivels the flying object 3 in the rightward direction and changes the shooting direction of the image-taking apparatus 21 to the direction toward the front when the vehicle 2 turns to the right.

A shot image shot by the image-taking apparatus 21 continues to be displayed on the display being looked at by a driver of the vehicle 2 or a fellow passenger via the floating type remote monitoring apparatus and the vehicle surroundings monitoring apparatus. Even if the traveling direction of the vehicle changes, the vehicle surroundings monitoring apparatus of the monitoring system 1 can provide a shot image corresponding to the running conditions. The driver or fellow passenger is capable of collecting information corresponding to the running conditions of the vehicle 2 by viewing a shot image displayed on the display.

If the traveling direction of the flying object 3 changes or if the traveling speed changes, a flight posture changes in accordance with acceleration or deceleration or a traveling direction angle. For example, when the flying object 3 increases in speed while going straight in the traveling direction, the flight posture of the flying object 3 is temporarily a forward-tilting posture. The flight posture of the flying object 3 changes with the image-taking apparatus 21 equipped on the flying object 3. For this reason, if the flying object 3 tilts forward, the shooting direction of the image-taking apparatus 21 changes with, for example, a change in posture of the flying object 3 tilting forward.

The floating type remote monitoring apparatus varies the traveling speed and the traveling direction angle with, for example, a change in the traveling direction or speed of the vehicle 2 and changes a posture of the image-taking apparatus 21 in a direction counteracting a change in posture of the flying object 3 through motor driving. In the case of the forward tilt, the floating type remote monitoring apparatus changes the posture of the image-taking apparatus 21, for example, in a direction counteracting a change in posture of the flying object 3 tilting forward. Even if the traveling direction or speed of the vehicle 2 changes, the vehicle surroundings monitoring apparatus of the monitoring system 1 can provide a stable shot image which is not affected by the posture of the flying object 3 that changes so as to follow the change of the vehicle 2.

For example, the floating type remote monitoring apparatus checks positional information received as information about the running conditions of the vehicle 2 against positional information on the flying object 3 to perform autonomous control such that the floating type remote monitoring apparatus continues to be present within a fixed distance defined in advance from the vehicle 2. If the floating type remote monitoring apparatus falls outside the fixed distance, the floating type remote monitoring apparatus transmits a request to reduce the running speed of the vehicle 2 to the vehicle surroundings monitoring apparatus. For example, the vehicle surroundings monitoring apparatus warns a driver or a fellow passenger on the basis of the request to reduce the running speed of the vehicle 2. The vehicle surroundings monitoring apparatus can present an instruction to reduce the running speed to the driver or fellow passenger, for example, in a situation where the running speed of the vehicle 2 exceeds the flight speed of the flying object 3 due to an external factor, such as a gust.

For example, if information about the running conditions of the vehicle 2 includes information on airbag deployment, shock detection, or the like, the floating type remote monitoring apparatus changes the shooting direction, the focal length, and the angle of view of the image-taking apparatus 21 and shoots the surroundings of the vehicle 2. For example, the floating type remote monitoring apparatus records a shot image obtained through the shooting in a particular region of a storage medium. The particular region refers to, for example, a region where access, such as read or write, is limited such that recorded information content is not tampered. The floating type remote monitoring apparatus as an event data recorder can record, for example, a picture shot from a viewpoint above the vehicle 2 subjected to shock.

Note that the floating type remote monitoring apparatus trey transmit the shot image shot by the image-taking apparatus 21 to the vehicle surroundings monitoring apparatus. The vehicle surroundings monitoring apparatus may store the shot image received from the floating type remote monitoring apparatus in, for example, a particular region where tampering is prohibited of an event data recorder. The vehicle surroundings monitoring apparatus can record, in the event data recorder, the conditions of the surroundings shot from the viewpoint above the vehicle 2 when the vehicle surroundings monitoring apparatus is subjected to shock.

A space (hereinafter also referred to as an arrival and departure field) where the flying object 3 is capable of arriving and departing can be provided at the vehicle 2 or a vehicle which runs parallel to and in the surroundings of the vehicle 2. If the vehicle 2 or the vehicle that runs parallel to and in the surroundings of the vehicle 2 includes an arrival and departure field for the flying object 3, the monitoring system 1 can perform the control below in a manner corresponding to the running status of and a change in behavior of the vehicle 2.

For example, if information about the running conditions of the vehicle 2 includes information indicating an idle reduction instruction or an idle reduction status, the floating type remote monitoring apparatus causes the flying object 3 to return temporarily to the arrival and departure field. The floating type remote monitoring apparatus can curb energy consumption, such as fuel consumption or power consumption, associated with flight of the flying object 3 while running of the vehicle 2 is stopped by causing the flying object 3 to return to the arrival and departure field. For example, if the flying object 3 is driven by a built-in storage battery, energy consumption of the storage battery can be curbed.

For example, the floating type remote monitoring apparatus performs prediction of entry into a no-fly area on the basis of positional information on and the traveling direction of the flying object 3. Information about a no-fly area is set in advance on the basis of, for example, geographic information by the vehicle surroundings monitoring apparatus. The floating type remote monitoring apparatus receives, as information about the running conditions of the vehicle 2, no-fly area information set in advance from the vehicle surroundings monitoring apparatus.

If the floating type remote monitoring apparatus predicts that the flying object 3 enters into a no-fly area, the floating type remote monitoring apparatus judges a relative distance between the no-fly area and the flying object 3. For example, if the relative distance between the no-fly area and the flying object 3 is not more than a predetermined value, the floating type remote monitoring apparatus causes the flying object 3 to return temporarily to the arrival and departure field. The floating type remote monitoring apparatus continues to judge the relative distance while the flying object 3 remains on the arrival and departure field. If the relative distance exceeds the predetermined value, the floating type remote monitoring apparatus causes the flying object 3 to start flying again. The floating type remote monitoring apparatus can inhibit flight in a no-fly area present in a running course of the vehicle 2 and restart flight outside the no-fly area by performing the judgment. Even if a no-fly area is present on the running course of the vehicle 2, the monitoring system 1 can continue to present a shot image corresponding to the running conditions.

For example, the floating type remote monitoring apparatus recognizes a traffic light for vehicles present in the traveling direction from a shot image shot by the image-taking apparatus 21 and predicts stopping of the vehicle 2 on the basis of a signal indication of the traffic light for vehicles. If stopping of the vehicle 2 is predicted, the floating type remote monitoring apparatus causes the flying object 3 to return temporarily to the arrival and departure field. For example, if a signal display color present 200 meters in front changes from green to yellow, the floating type remote monitoring apparatus can give priority to information on a change in the signal indication and cause the flying object 3 to return early even when the vehicle 2 is not decelerating. This allows a further curb on energy consumption associated with flight of the flying object 3.

Note that a charger for supplying power to the storage battery built into the flying object 3 may be provided at the arrival and departure field and that the flying object 3 may be charged at the time of temporary return. Replenishment of the storage battery with power at the time of return of the flying object 3 allows extension of the duration of flight of the flying object 3. The monitoring system 1 can provide long-term driving assistance using the floating type remote monitoring apparatus and the vehicle surroundings monitoring apparatus.

Apparatus Configuration

Figure 2:
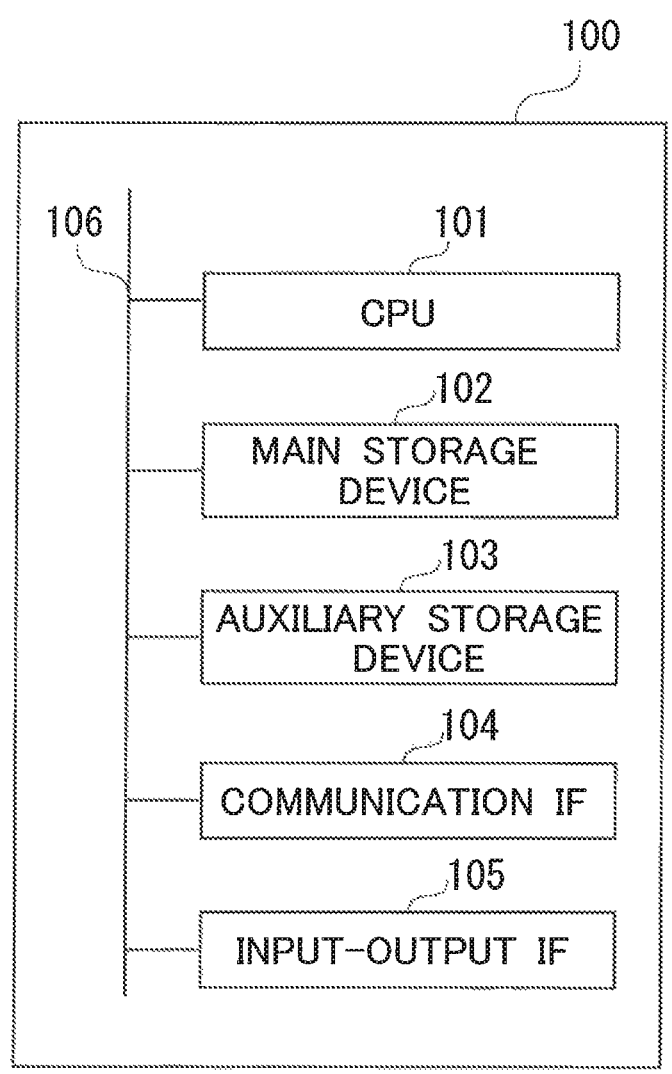
FIG. 2 is a diagram illustrating one example of the hardware configuration of a computer.

FIG. 2 is a diagram illustrating one example of the hardware configuration of a computer. A computer 100 illustrated in FIG. 2 includes a central processing unit (CPU) 101, a main storage device 102, an auxiliary storage device 103, a communication interface (IF) 104, and an input-output IF 105 which are interconnected by a connection bus 106. The CPU 101 is also called a processor. Note that the hardware configuration is not limited to a configuration in which a single processor is provided as a CPU and may be a multiprocessor configuration. A single CPU connected by a single socket may have a multicore configuration.

The CPU 101 is a central processing unit which controls the entire computer 100. The CPU 101 provides a function which suits a predetermined purpose by loading a program stored in the auxiliary storage device 103 onto a work region of the main storage device 102 in executable form and controlling peripheral equipment through execution of the program. The main storage device 102 is a storage medium, in which the CPU 101 caches a program or data and in which a work region is provided. The main storage device 102 includes, for example, a flash memory, a random access memory (RAM), and a read only memory (ROM). The auxiliary storage device 103 is a storage medium which stores a program to be executed by the CPU 101, operation setting information, and the like. The auxiliary storage device 103 is, for example, a hard-disk drive (HDD), a solid state drive (SSD), an erasable programmable ROM (EPROM), a flash memory, a universal serial bus (USS) memory, a secure digital (SD) memory card, or the like. The communication IF 104 is an interface with a network connected to the computer 100. The communication IF 104 includes a wireless communication module which performs communication on the basis of a predetermined standard. The input-output IF 105 is an interface for data input and output from and to a sensor or an apparatus connected to the computer 100. Note that the number of each of the constituent elements may be two or more or some of the constituent elements may be omitted.

Figure 3:
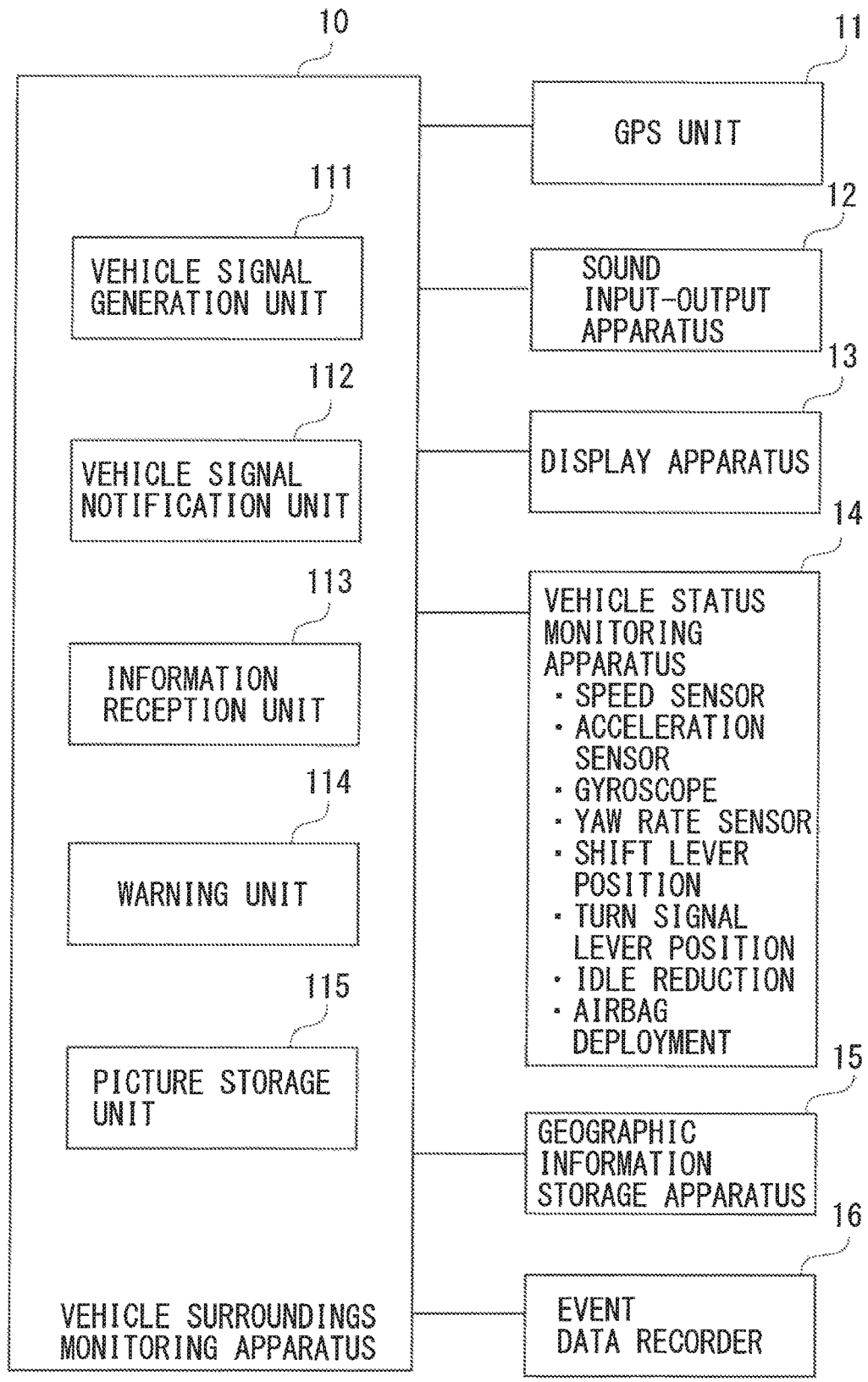
FIG. 3 is a processing block diagram illustrating one example of a vehicle surroundings monitoring apparatus.

Execution of a program by the CPU 101 provides processes of a vehicle signal generation unit 111, a vehicle signal notification unit 112, an information reception unit 113, a warning unit 114, and a picture storage unit 115 of a vehicle surroundings monitoring apparatus 10 illustrated in FIG. 3. Execution of a program by the CPU 101 also provides processes of a vehicle signal reception unit 121, a determination unit 122, a shot image acquisition unit 123, an information transmission unit 124, a picture storage unit 125, and a map information holding unit 126 of a floating type remote monitoring apparatus 20 illustrated in FIG. 4. Note that processes of at least some of the units illustrated in FIGS. 3 and 4 may each be provided by a digital signal processor (DSP), an application specific integrated circuit (ASIC), or the like. At least some of the units illustrated in FIGS. 3 and 4 may each be a dedicated large scale integration (LSI), such as a field-programmable gate array (FPGA), or any other digital circuit. An analog circuit may be included in each of at least some of the units illustrated in FIGS. 3 and 4.

[Processing Block Configuration] (Vehicle Surroundings Monitoring Apparatus)

FIG. 3 is a processing block diagram illustrating one example of the vehicle surroundings monitoring apparatus 10. As illustrated in FIG. 3, sensors and apparatuses equipped on the vehicle 2 are connected to the vehicle surroundings monitoring apparatus 10 via the Controller Area Network (CAN), the Local Interconnect Network (LIN), or the like. The sensors and apparatuses connected to the vehicle surroundings monitoring apparatus 10 include, for example, a GPS unit 11, a sound input-output apparatus 12, a display apparatus 13, a vehicle status monitoring apparatus 14, a geographic information storage apparatus 15, and an event data recorder 16. The vehicle surroundings monitoring apparatus 10 acquires pieces of information about the running conditions of the vehicle 2 from the GPS unit 11, the vehicle status monitoring apparatus 14, and the geographic information storage apparatus 15. The vehicle surroundings monitoring apparatus 10 outputs collected information to the sound input-output apparatus 12, the display apparatus 13, and the event data recorder 16 via the floating type remote monitoring apparatus 20.

The GPS unit 11 includes a receiver which receives a GPS signal from a GPS satellite and calculates positional information (longitude and latitude) on the vehicle 2 equipped with the GPS unit 11 on the basis of the received GPS signal.

The sound input-output apparatus 12 is an input apparatus, such as a microphone, and an output apparatus, such as a speaker. For example, the sound input-output apparatus 12 gives notification of a warning to a driver of the vehicle 2 or a fellow passenger which is output from the vehicle surroundings monitoring apparatus 10 in an acoustical manner or the like.

The display apparatus 13 is removable electronic equipment, such as a stationary car navigation system, a mobile car navigation apparatus, or a smartphone. Examples of the display apparatus 13 include a head-up display which projects a picture onto a windshield of the vehicle 2 and spectacle type smart glasses wearable by a driver. The display apparatus 13 receives an output from the vehicle surroundings monitoring apparatus 10 and displays a warning. The display apparatus 13 also displays a shot image output from the vehicle surroundings monitoring apparatus 10 on a display device. Note that the sound input-output apparatus 12 and the display apparatus 13 may be, for example, integral with the vehicle surroundings monitoring apparatus 10.

The vehicle status monitoring apparatus 14 is an apparatus which collects detection values from the various sensors equipped on the vehicle 2 and output signals from mounted units with a fixed period of 100 ms and outputs the detection values and the output signals to the vehicle surroundings monitoring apparatus 10. The vehicle status monitoring apparatus 14 collects the detection values and the output signals via, for example, CAN. The vehicle status monitoring apparatus 14 collects, for examples, detection values from a speed sensor, an acceleration sensor, a gyroscope, and a yaw rate sensor. The vehicle status monitoring apparatus 14 also collects, for example, a signal indicating a shift lever position, a signal indicating a turn signal lever position, an idle reduction instruction signal or status signal, and a signal indicating airbag deployment. The vehicle status monitoring apparatus 14 outputs the collected detection values and output signals to the vehicle surroundings monitoring apparatus 10. Note that the vehicle status monitoring apparatus 14 may be included in the vehicle surroundings monitoring apparatus 10.

The geographic information storage apparatus 15 is a storage apparatus which stores geographic information. The event data recorder 16 is a recording apparatus which records a shot image shot by a camera equipped on the vehicle 2. The vehicle surroundings monitoring apparatus 10 records a shot image acquired from the floating type remote monitoring apparatus 20 at the time of detection of shock to the vehicle 2 in a particular region where tampering is prohibited of the event data recorder 16.

The vehicle signal generation unit 111 generates information about the running conditions of the vehicle 2 as a vehicle signal. The vehicle signal generation unit 111 acquires, for example, positional information (longitude and latitude) on the vehicle 2 which is calculated by the GPS unit 11 via the input-output IF 105. Note that the vehicle signal generation unit 111 may acquire a GPS signal received by the GPS receiver from the GPS unit 11. The vehicle signal generation unit 111 acquires, for example, detection values from the various sensors and output signals from the mounted units collected by the vehicle status monitoring apparatus 14 via the input-output IF 105. Acquisition of the positional information or the GPS signal, the detection values from the various sensors, and the output signals from the mounted units are performed with the fixed period of, for example, 100 ms.

The vehicle signal generation unit 111 refers to the auxiliary storage device 103 and acquires coordinate information on a no-fly area for the flying object 3 which is set in advance. Note that, if the no-fly area present in a traveling course of the vehicle 2 can be acquired from geographic information, the vehicle signal generation unit 111 may acquire coordinate information on the no-fly area from the geographic information storage apparatus 15.

The vehicle signal generation unit 111 generates a vehicle signal on the basis of the pieces of information acquired from the GPS unit 11 and the vehicle status monitoring apparatus 14 and the coordinate information on the no-fly area set in advance. The generated vehicle signal is passed to the vehicle signal notification unit 112 with a period of, for example, 100 ms.

The vehicle signal notification unit 112 transmits a vehicle signal generated by the vehicle signal generation unit 111 to the floating type remote monitoring apparatus 20 via the communication IF 104. The vehicle signal is transmitted in accordance with a wireless communication standard prescribed in the wireless communication module.

The information reception unit 113 receives information transmitted from the floating type remote monitoring apparatus 20 via the communication IF 104. Examples of information transmitted from the floating type remote monitoring apparatus 20 include a shot image shot in a manner corresponding to the running conditions of the vehicle 2, a request to reduce the running speed of the vehicle 2, and a shot image shot from a viewpoint above the vehicle 2 subjected to shock.

The information reception unit 113 outputs, for example, the shot image shot in the manner corresponding to the running conditions of the vehicle 2 to the display apparatus 13 via the input-output IF 105. The information reception unit 113 passes, for example, the request to reduce the running speed of the vehicle 2 to the warning unit 114. The information reception unit 113 outputs, for example, the shot image shot from the viewpoint above the vehicle 2 subjected to the shock to the display apparatus 13 and passes the shot image to the picture storage unit 115.

The warning unit 114 generates a warning to be presented to a driver of the vehicle 2 or a fellow passenger on the basis of a request to reduce the running speed of the vehicle 2. The warning unit 114 outputs, for example, a warning tone or a voice message set in advance to the sound input-output apparatus 12. Similarly, the warning unit 114 causes, for example, the display apparatus 13 to display a warning sign or a display message set in advance. For example, the warning sign or the display message is displayed so as to be superimposed on a shot image being viewed on the display device of the display apparatus 13.

The picture storage unit 115 temporarily stores a shot image shot from a viewpoint above the vehicle 2 subjected to shock in a predetermined region of the main storage device 102. The picture storage unit 115 notifies the event data recorder 16 of an interrupt signal and outputs the shot image to the event data recorder 16. The event data recorder 16 uses the interrupt signal, notification of which is given from the picture storage unit 115, as a trigger to record the shot image in a particular region of a storage medium.

Floating Type Remote Monitoring Apparatus

Figure 4:
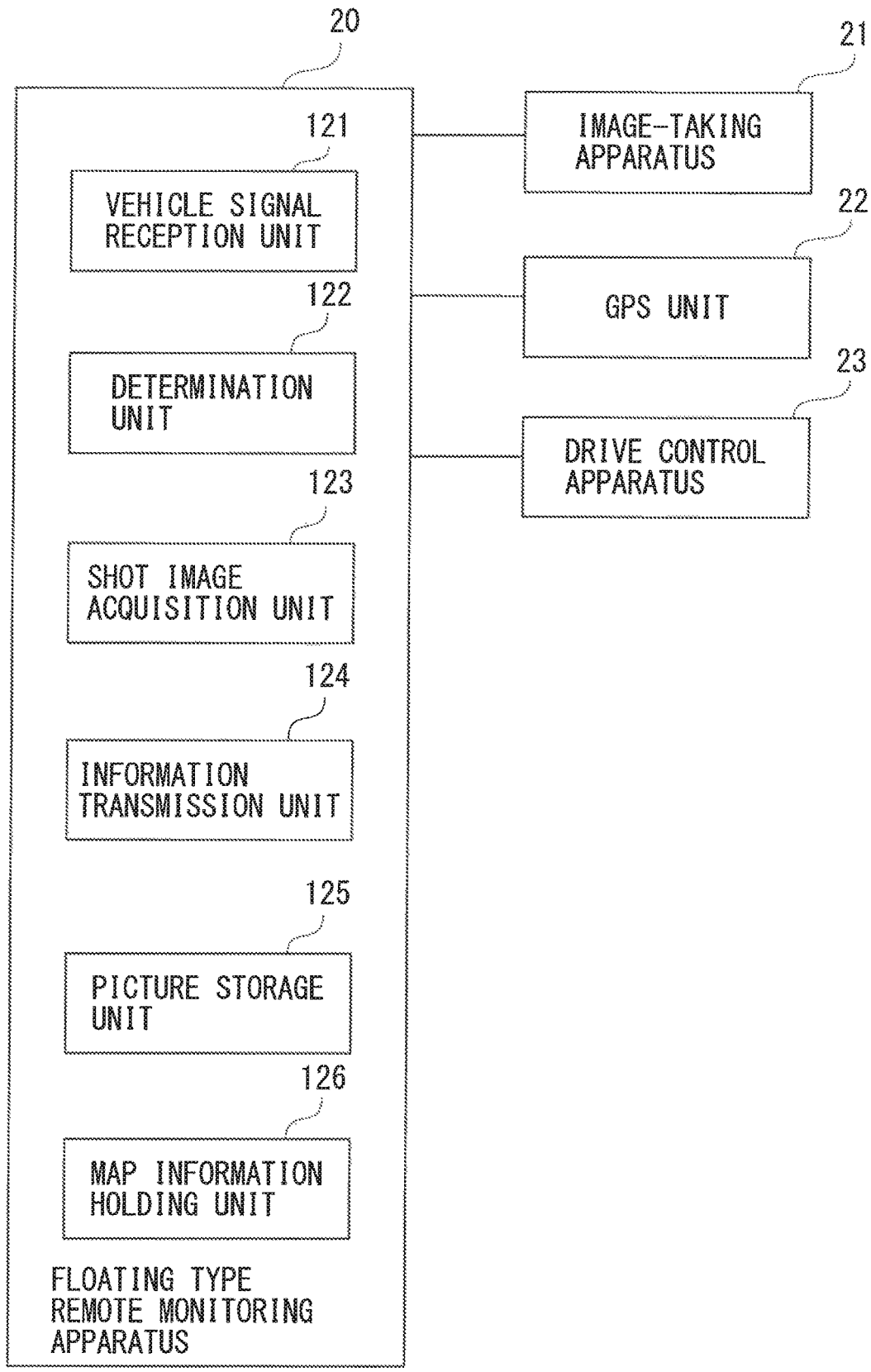
FIG. 4 is a processing block diagram illustrating one example of a floating type remote monitoring apparatus.

FIG. 4 is a processing block diagram illustrating one example of the floating type remote monitoring apparatus 20. Note that an apparatus other than the image-taking apparatus 21 which allows autonomous flight is equipped on the flying object 3. As examples of the apparatus to be equipped on the flying object 3, a GPS unit 22 and a drive control apparatus 23 can be presented. As illustrated in FIG. 4, the image-taking apparatus 21, the GPS unit 22, and the drive control apparatus 23 are connected to the floating type remote monitoring apparatus 20. The floating type remote monitoring apparatus 20 controls the image-taking apparatus 21 and the drive control apparatus 23 on the basis of a vehicle signal transmitted from the vehicle surroundings monitoring apparatus 10. The floating type remote monitoring apparatus 20 transmits a shot image corresponding to the running conditions of the vehicle 2 which is shot by the image-taking apparatus 21 to the vehicle surroundings monitoring apparatus 10.

The image-taking apparatus 21 is a camera which has an image pickup device, such as a charge-coupled device (CCD) or a complementary metal oxide semiconductor (CMOS). The image-taking apparatus 21 has a control mechanism for changing the camera focal length and the angle of view. The image-taking apparatus 21 also has a control mechanism for changing the camera shooting direction in a vertical direction or a lateral direction. A shot image shot by the image-taking apparatus 21 is output to the floating type remote monitoring apparatus 20. The control mechanisms of the image-taking apparatus 21 are controlled by the floating type remote monitoring apparatus 20.

The GPS unit 22 includes a receiver which receives a GPS signal from a GPS satellite and calculates positional information (longitude, latitude, and altitude) on the flying object 3 equipped with the GPS unit 22 on the basis of a received GPS signal.

The drive control apparatus 23 is an apparatus which controls flight of the flying object 3. For example, the drive control apparatus 23 varies driving power for the flying object 3 in response to an increase or decrease in the flight speed or a change in the traveling direction or the traveling direction angle, on the basis of a GPS signal from the flying object 3 and a GPS signal from the vehicle 2. The flying object 3 flies autonomously in the surroundings of the running vehicle 2 under flight control of the drive control apparatus 23. Upon receipt of a return instruction, the flying object 3 returns to an arrival and departure field provided at the vehicle 2 or a vehicle which runs parallel to and in the surroundings of the vehicle 2.

The vehicle signal reception unit 121 receives a vehicle signal transmitted from the vehicle surroundings monitoring apparatus 10 via the communication IF 104. Such a vehicle signal is received with the fixed period of, for example, 100 ms. The vehicle signal reception unit 121 temporarily stores the received vehicle signal in a predetermined region of the main storage device 102. The vehicle signal reception unit 121 passes the received vehicle signal to the determination unit 122. Note that, if the received vehicle signal includes information (coordinate information) on the no-fly area, the vehicle signal reception unit 121 stores the information on the no-fly area in the map information holding unit 126.

The determination unit 122 performs flight control of the flying object 3 and shooting control of the image-taking apparatus 21 on the basis of a vehicle signal passed from the vehicle signal reception unit 121. The flight control of the flying object 3 is performed via the drive control apparatus 23. The shooting control of the image-taking apparatus 21 is performed by the control mechanisms of the image-taking apparatus 21.

The determination unit 122 holds, for example, map information, in which a flight control value and a shooting control value corresponding to the vehicle speed are stored in advance, in the map information holding unit 126. The determination unit 122 reads out, for example, map values associated with a vehicle speed of the vehicle 2 which is received with a fixed period and outputs the map values to the image-taking apparatus 21 and the drive control apparatus 23. As a result, the flying object 3 can vary the flight speed (traveling speed) such that the flight speed follows the speed of the vehicle 2, and the image-taking apparatus 21 can change the focal length, the angle of view, and the shooting direction to suit the flight speed of the flying object 3. Note that the map information can be experimentally acquired in advance. For example, the flying object 3 is experimentally made to fly while following the vehicle 2, and a relative relationship between the vehicle speed and the flight speed and a relative relationship between the flight speed, and the focal length, the angle of view, the shooting direction, and the like are obtained. Map information, in which map values corresponding to a vehicle speed are stored, may be created from the obtained relative relationships.

Similarly, for example, the determination unit 122 refers to the map information holding unit 126, reads out map values from map information, in which a flight control value and a shooting control value corresponding to an acceleration rate or a yaw rate of a received vehicle signal are stored, and outputs the map values to the image-taking apparatus 21 and the drive control apparatus 23. The flying object 3 can increase or decrease the flight speed such that the flight speed follows a change in the traveling direction of the vehicle 2 and vary the traveling direction angle. Additionally, the image-taking apparatus 21 can change the posture of the image-taking apparatus 21 in a direction counteracting effects of a change in posture of the flying object 3 through motor driving.

The determination unit 122 outputs GPS information acquired from the GPS unit 22 with a fixed period of 100 ms and received GPS information on the vehicle 2 to the drive control apparatus 23. In the drive control apparatus 23, autonomous flight control of the flying object 3 is performed on the basis of the output pieces of GPS information. Note that the positional information may be a GPS signal. Note that the determination unit 122 checks the pieces of GPS information acquired with the fixed period against each other and determines whether a relative distance between the flying object 3 and the vehicle 2 is not more than a fixed distance. If the relative distance between the flying object 3 and the vehicle 2 is more than the fixed distance, the determination unit 122 outputs, for example, a request signal for reducing the vehicle speed to the information transmission unit 124.

If a vehicle signal includes an idle reduction instruction signal or status signal, the determination unit 122 outputs a return instruction for the flying object 3 to the drive control apparatus 23. Upon receipt of the return instruction from the determination unit 122, the drive control apparatus 23 controls driving power such that the flying object 3 returns to the arrival and departure field provided at the vehicle 2 or the like.

The determination unit 122 calculates a relative distance from the no-fly area on the basis of coordinate information on the no-fly area stored in the map information holding unit 1 and GPS information acquired from the GPS unit 22. The determination unit 122 outputs a return instruction for the flying object 3 to the drive control apparatus 23 if the calculated relative distance is not more than a fixed distance. Note that the determination unit 122 continues to calculate the relative distance after return of the flying object 3. If the calculated relative distance exceeds the fixed distance, the determination unit 122 outputs a flight start instruction to the drive control apparatus 23. Upon receipt of the flight start instruction from the determination unit 122, the drive control apparatus 23 controls the driving power such that the flying object 3 departs from the arrival and departure field.

The determination unit 122 recognizes a traffic light for vehicles present in the traveling direction from a shot image recorded in the picture storage unit 125. The recognition of the traffic light for vehicles is performed through image recognition processing. For example, the determination unit 122 recognizes the traffic light for vehicles by matching the shot image against a pattern registered in advance for a traffic light for vehicles. The determination unit 122 continues to monitor, for example, a signal display color of the traffic light recognized from the shot image for a fixed period. For example, if the signal display color changes from green to yellow, the determination unit 122 outputs a return signal to the drive control apparatus 23.

If a signal indicating that a change in the acceleration rate of the vehicle 2 is not less than a fixed value or a signal indicating airbag deployment is included, the determination unit 122 outputs a stay instruction to the drive control apparatus 23. The determination unit 122 refers to the map information holding unit 126, reads out a map value associated with a signal indicating that a change in the acceleration rate of the vehicle 2 is not less than the fixed value, and outputs the map value to the image-taking apparatus 21. The determination unit 122 gives an instruction to record a shot image in a particular region of a storage medium to the picture storage unit 125. The image-taking apparatus 21 changes the shooting direction and the angle of view on the basis of the map value and shoots the surroundings of the vehicle 2. A shot image obtained through the shooting is recorded in the particular region of the storage medium.

The shot image acquisition unit 123 acquires a shot image output from the image-taking apparatus 21. The acquired shot image is output to the information transmission unit 124 and the picture storage unit 125. The information transmission unit 124 transmits a request signal for reducing the vehicle speed output from the determination unit 122 and the shot image acquired by the shot image acquisition unit 123 to the vehicle surroundings monitoring apparatus 10 via the communication IF 104. The picture storage unit 125 records the shot image acquired by the shot image acquisition unit 123. Note that the picture storage unit 125 records the shot image acquired by the shot image acquisition unit 123 in the particular region of the storage medium upon receipt of an instruction from the determination unit 122. The nap information holding unit 126 is an auxiliary storage device which holds map information, no-fly area information, and various setting values as described above. Note that geographic information may be included in the map information holding unit 126.

[Processing Flow] (Focal Length Control Process)

Figure 5:
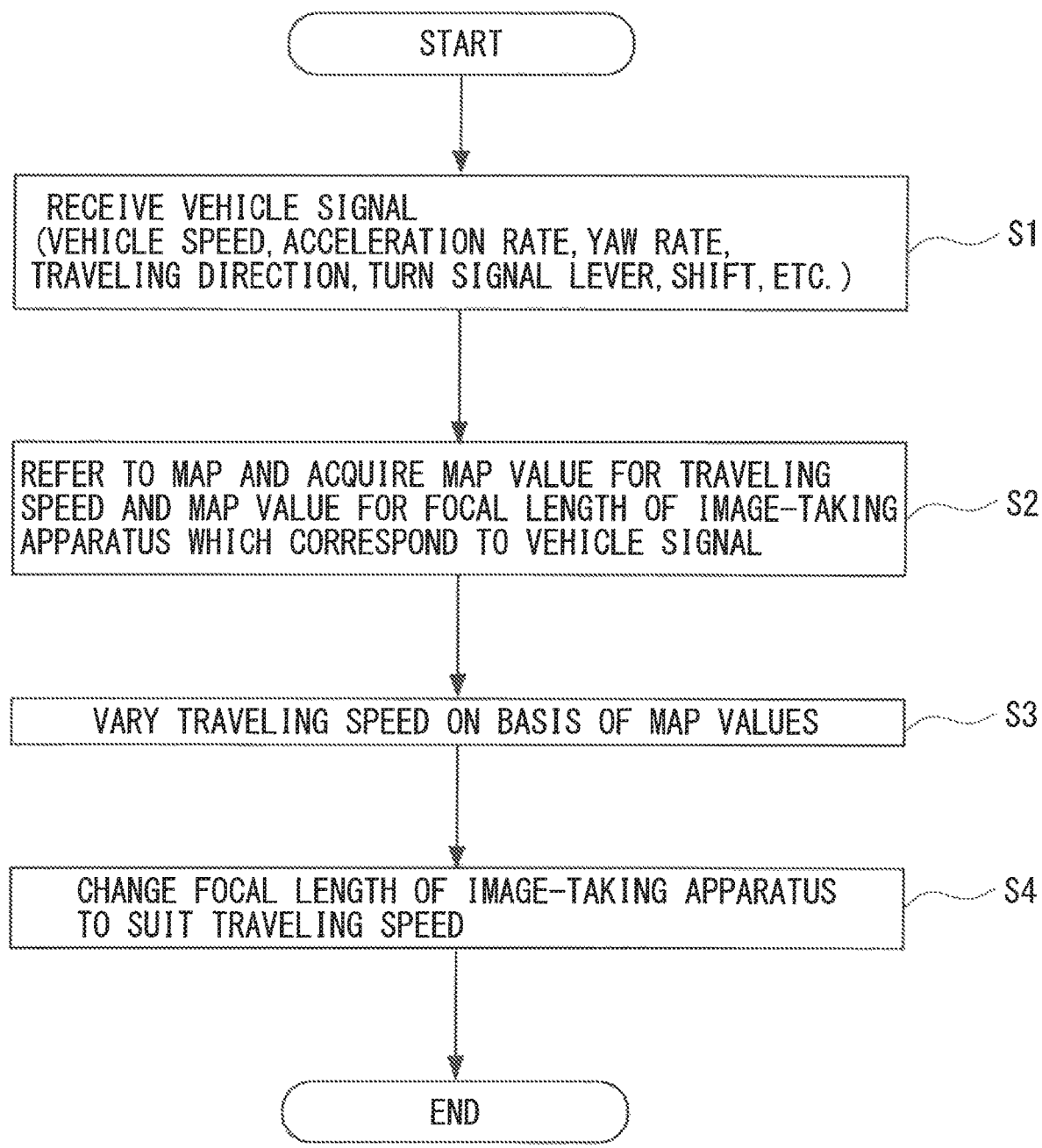
FIG. 5 is a flowchart illustrating one example of a process of controlling a focal length of an image-taking apparatus.

FIG. 5 is a flowchart illustrating one example of a process of controlling the focal length of the image-taking apparatus 21. In the flowchart illustrated in FIG. 5, the timing of reception of a vehicle signal transmitted from the vehicle surroundings monitoring apparatus 10 of the vehicle 2 can be presented as the timing for starting the process. The floating type remote monitoring apparatus 20 equipped on the flying object 3 acquires a vehicle signal transmitted from the vehicle surroundings monitoring apparatus 10 of the vehicle 2 via the communication IF 104 (S1). The acquired vehicle signal is temporarily stored in the predetermined region of the main storage device 102.

The floating type remote monitoring apparatus 20 refers to map information stored in the map information holding unit 126 and acquires a mop value for controlling the flight speed (traveling speed) and a map value for controlling the focal length of the image-taking apparatus 21 which correspond to the vehicle signal (S2). The floating type remote monitoring apparatus 20 varies the traveling speed of the flying object 3 on the basis of the acquired nap values (S3). The floating type remote monitoring apparatus 20 changes the focal length of the image-taking apparatus 21 to suit the traveling speed of the flying object 3 (S4).

With the above-described process, the floating type remote monitoring apparatus 20 can change the focal length of the image-taking apparatus 21 in a manner corresponding to the running conditions of the vehicle 2. For example, if the running speed of the vehicle 2 increases (the vehicle 2 accelerates), the floating type remote monitoring apparatus 20 can shoot the distance along the traveling direction by varying (increasing) the traveling speed of the flying object 3 and changing the focal length of the image-taking apparatus 21 to a longer one to suit the flight speed. If the running speed of the vehicle 2 decreases, the floating type remote monitoring apparatus 20 can shoot, for example, the vicinity along the traveling direction of the flying object 3 by decreasing the traveling speed of the flying object 3 and changing the focal length of the image-taking apparatus 21 to a shorter one to suit the flight speed.

Angle-of-View Control Process

Figure 6:
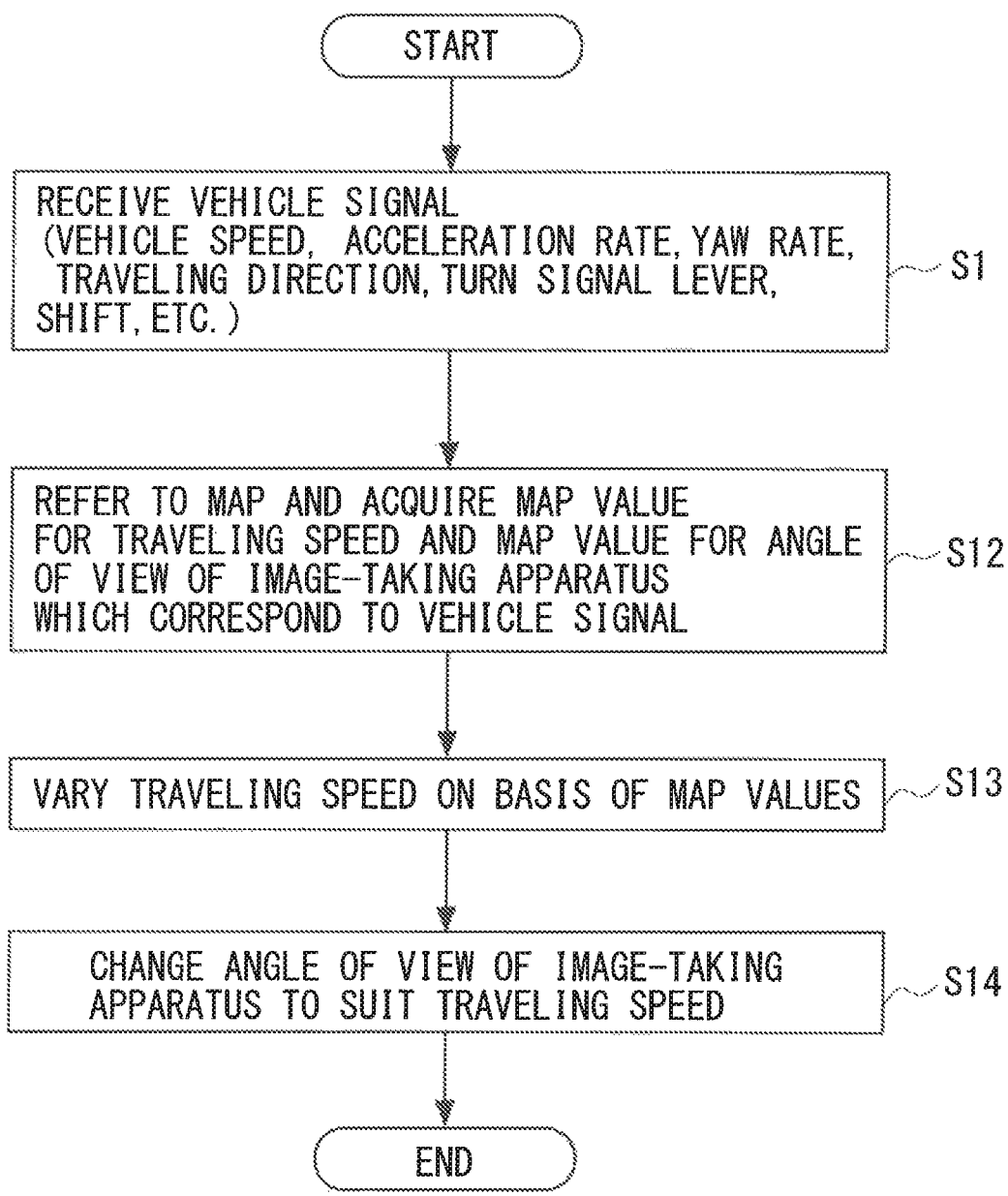
FIG. 6 is a flowchart illustrating one example of a process of controlling an angle of view of the image-taking apparatus.

FIG. 6 is a flowchart illustrating one example of a process of controlling the angle of view of the image-taking apparatus 21. In the flowchart illustrated in FIG. 6, the timing for staring the process is the same as in FIG. 5. The floating type remote monitoring apparatus 20 acquires a vehicle signal transmitted from the vehicle surroundings monitoring apparatus 10 of the vehicle 2 via the communication IF 104 and temporarily stores the acquired vehicle signal in the predetermined region of the main storage device 102 (S1).

The floating type remote monitoring apparatus 20 refers to map information stored in the map information holding unit 126 and acquires a map value for controlling the flight speed (traveling speed) and a map value for controlling the angle of view of the image-taking apparatus 21 which correspond to the vehicle signal (S12). The floating type remote monitoring apparatus 20 varies the traveling speed of the flying object 3 on the basis of the acquired map values (S13). The floating type remote monitoring apparatus 20 changes the angle of view of the image-taking apparatus 21 to suit the traveling speed of the flying object 3 (S14).

With the above-described process, the floating type remote monitoring apparatus 20 can change the angle of view of the image-taking apparatus 21 in a manner corresponding to the running conditions of the vehicle 2. For example, if the running speed of the vehicle 2 is low, the floating type remote monitoring apparatus 20 can shoot the surroundings of the vehicle 2 by varying the traveling speed of the flying object 3 and changing the angle of view of the image-taking apparatus 21 to suit the flight speed. For example, the floating type remote monitoring apparatus 20 increases the angle of view with a decrease in the running speed of the vehicle 2. The floating type remote monitoring apparatus 20 shoots the vehicle surroundings if the running speed of the vehicle 2 is less than a fixed reference value. The floating type remote monitoring apparatus 20 decreases the angle of view with an increase in the running speed of the vehicle 2. The floating type remote monitoring apparatus 20 shoots a narrow range in front of the vehicle 2.

Shooting Direction Control Process

Figure 7:
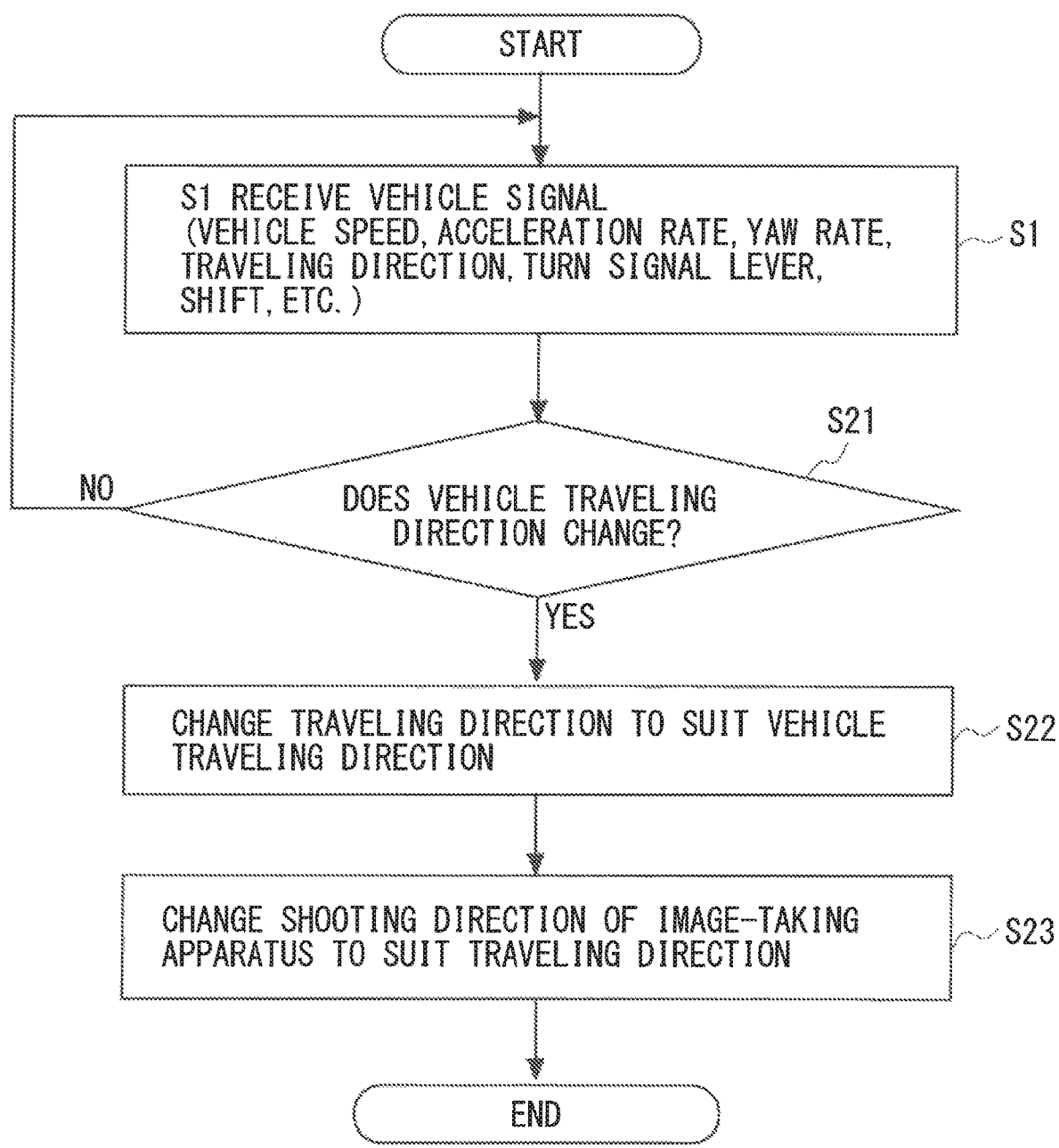
FIG. 7 is a flowchart illustrating one example of a process of controlling a shooting direction of the image-taking apparatus.

FIG. 7 is a flowchart illustrating one example of a process of controlling the shooting direction of the image-taking apparatus 21. In the flowchart illustrated in FIG. 7, the timing for staring the process is the same as in FIG. 5. The floating type remote monitoring apparatus 20 acquires a vehicle signal transmitted from the vehicle surroundings monitoring apparatus 10 of the vehicle 2 via the communication IF 104 and temporarily stores the acquired vehicle signal in the predetermined region of the main storage device 102 (S1).

The floating type remote monitoring apparatus 20 judges, from the acceleration rate, the yaw rate, the specified position of the turn signal lever, and the like of the vehicle 2, whether the traveling direction of the vehicle 2 changes (S21). If the traveling direction of the vehicle 2 does not change (NO in S21), the floating type remote monitoring apparatus 20 repeats the processes in S1 and S21. On the other hand, if the traveling direction of the vehicle 2 changes (YES in S21), the floating type remote monitoring apparatus 20 shifts to a process in S22.

The floating type remote monitoring apparatus 20 refers to map information stored in the map information holding unit 126 and acquires a amp value for controlling the traveling direction of the flying object 3 and a map value for controlling the shooting direction of the image-taking apparatus 21 which correspond to the vehicle traveling direction. The floating type remote monitoring apparatus 20 changes the traveling direction of the flying object 3 to suit the vehicle traveling direction (S22). The floating type remote monitoring apparatus 20 also changes the shooting direction of the image-taking apparatus 21 to suit the traveling direction of the flying object 3 (S23).

With the above-described process, the floating type remote monitoring apparatus 20 can change the shooting direction of the image-taking apparatus 21 in a manner corresponding to a change in the traveling direction of the vehicle 2. For example, if the vehicle 2 turns to the right, the floating type remote monitoring apparatus 20 swivels the flying object 3 in the rightward direction and changes the shooting direction of the image-taking apparatus 21 to a direction toward the front when the vehicle 2 turns to the right. The floating type remote monitoring apparatus 20 can shoot a fan-shaped range including the traveling direction of the vehicle 2 before steering and the traveling direction after the steering, and a direction of change in traveling angle. The floating type remote monitoring apparatus 20 can continuously provide a shot image in the traveling direction which changes in a manner corresponding to a change in the traveling direction of the vehicle 2. For example, even if the traveling direction of the vehicle 2 changes, the floating type remote monitoring apparatus 20 can continue to shoot a shot image of the front of the vehicle 2 corresponding to a changing field of view.

Process of Controlling Orientation of Image-Taking Apparatus

Figure 8:
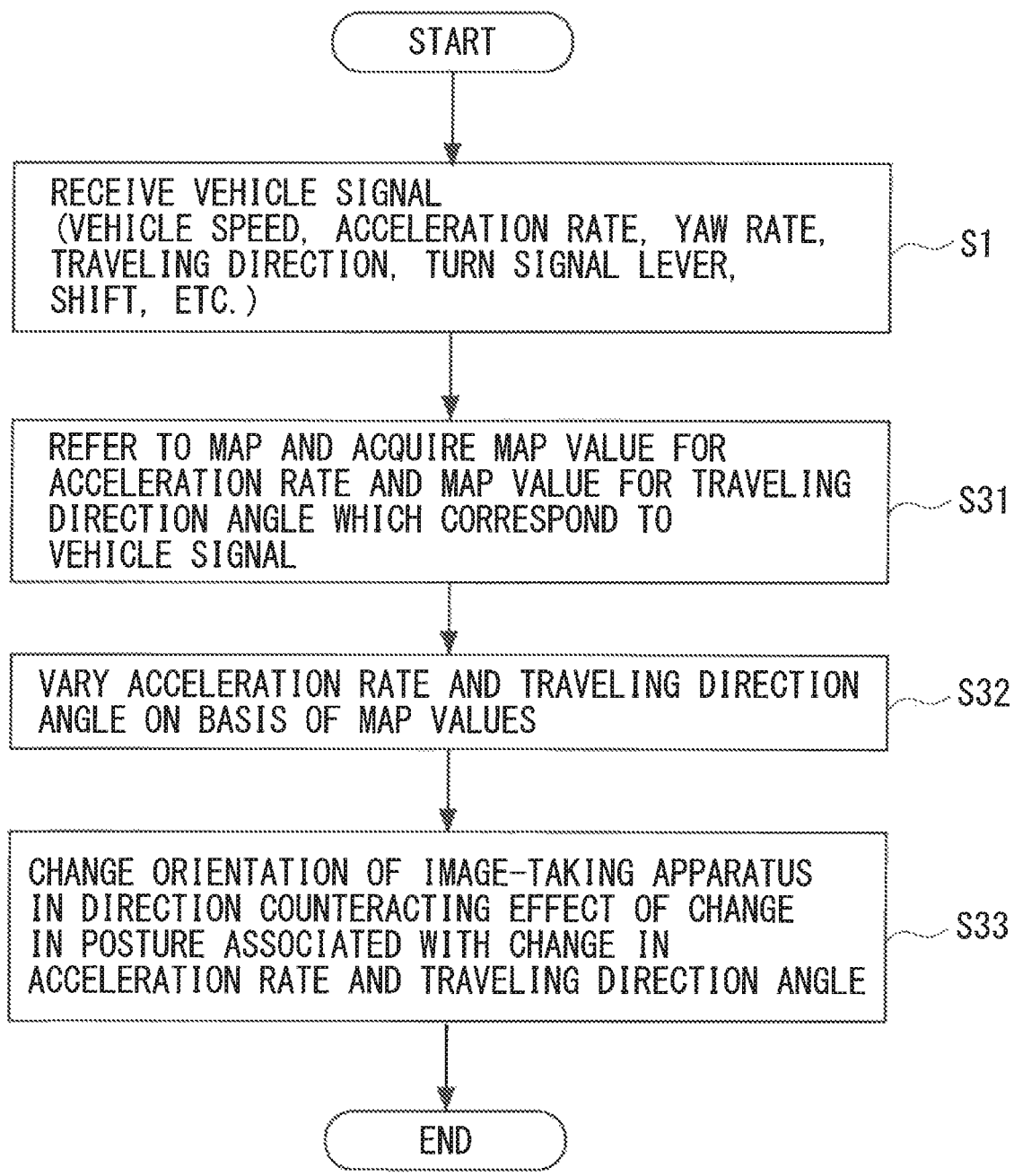
FIG. 8 is a flowchart illustrating one example of a process of controlling an orientation of the image-taking apparatus.

FIG. 8 is a flowchart illustrating one example of a process of controlling an orientation of the image-taking apparatus 21. In the flowchart illustrated in FIG. 8, the timing for staring the process is the same as in FIG. 5. The floating type remote monitoring apparatus 20 acquires a vehicle signal transmitted from the vehicle surroundings monitoring apparatus 10 of the vehicle 2 via the communication IF 104 and temporarily stores the acquired vehicle signal in the predetermined region of the main storage device 102 (S1).

The floating type remote monitoring apparatus 20 refers to map information stored in the map information holding unit 126 and acquires map values for controlling the acceleration rate and the traveling direction angle of the flying object 3 and a map value for controlling the orientation of the image-taking apparatus 21 which correspond to the vehicle signal (S31). The floating type remote monitoring apparatus 20 varies the acceleration rate and the traveling direction angle of the flying object 3 (S32). The floating type remote monitoring apparatus 20 changes the orientation of the image-taking apparatus 21 in a direction counteracting effects of a change in posture of the flying object 3 (S33).

With the above-described process, the floating type remote monitoring apparatus 20 can change the orientation of the image-taking apparatus 21 in a direction counteracting effects of a change in posture even if the posture of the flying object 3 changes in a manner corresponding to the running conditions of the vehicle 2. For example, even if the posture of the flying object 3 is a forward-tilting posture, the floating type remote monitoring apparatus 20 can shoot a stable shot image which is not affected by the change in posture of the flying object 3. The focal length control, the angle-of-view control, the shooting direction control, and the image-taking apparatus orientation control are examples of control of a method for acquiring information on the vehicle surroundings.

Return Process Based on Image Recognition

Figure 9:
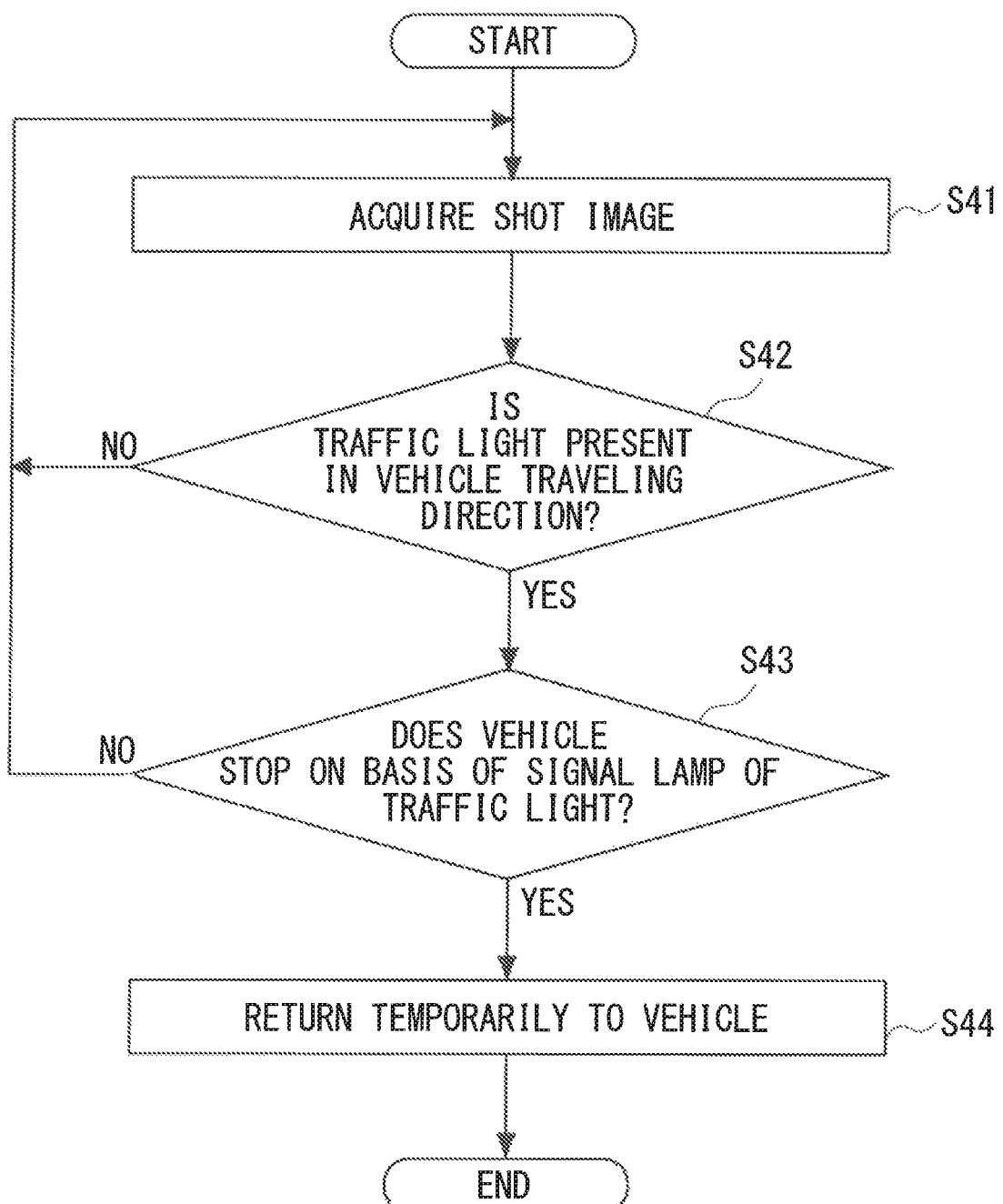
FIG. 9 is a flowchart illustrating one example of a return process based on image recognition.

FIG. 9 is a flowchart illustrating one example of a return process based on image recognition. In the flowchart illustrated in FIG. 9, the timing for starting the process can be exemplified by the timing of acquisition of a shot image shot via the image-taking apparatus 21. For example, the floating type remote monitoring apparatus 20 acquires a shot image recorded in the picture storage unit 125 (S41).

The floating type remote monitoring apparatus 20 performs, for example, pattern matching based on a traffic light for vehicles on the acquired shot image and judges whether a traffic light is present in the vehicle traveling direction (S42). If no traffic light is present in the vehicle traveling direction (NO in S42), the floating type remote monitoring apparatus 20 repeats the processes in S41 and S42. On the other hand, if a traffic light is present in the vehicle traveling direction (YES in S42), the floating type remote monitoring apparatus 20 shifts to a process in S43.

In the process in S43, the floating type remote monitoring apparatus 20 judges, on the basis of a signal lamp of the traffic light, whether the vehicle 2 stops. For example, the floating type remote monitoring apparatus 20 predicts stopping of the vehicle 2 on the basis of a change (from green to yellow) in display color of the signal lamp. If stopping of the vehicle 2 is not predicted (NO in S43), the floating type remote monitoring apparatus 20 repeats the processes in S41 to S43. On the other hand, it stopping of the vehicle 2 is predicted (YES in S43), the floating type remote monitoring apparatus 20 causes the flying object 3 to return temporarily to the arrival and departure field provided at the vehicle 2 or the like (S44).

With the above-described process, the floating type remote monitoring apparatus 20 can perform control on the basis of a shot image shot via the image-taking apparatus 21 such that the flying object 3 returns temporarily. The floating type remote monitoring apparatus 20 can give priority to information on a change in signal indication and cause the flying object 3 to return early even when the vehicle 2 is not decelerating. This allows a curb on energy consumption associated with flight of the flying object 3.

Return Process Based on Vehicle Stopping

Figure 10:
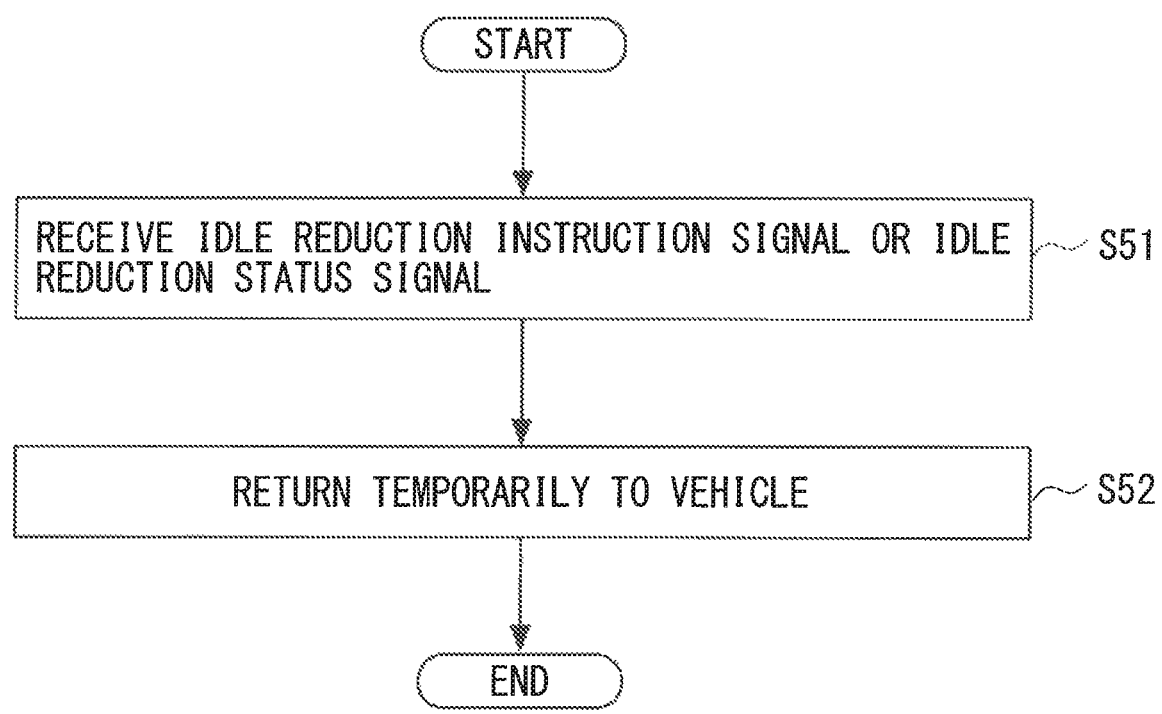
FIG. 10 is a flowchart illustrating one example of a return process based on vehicle idle reduction.

FIG. 10 is a flowchart illustrating one example of a return process based on idle reduction in the vehicle 2. In the flowchart illustrated in FIG. 10, the timing of reception of a vehicle signal transmitted from the vehicle surroundings monitoring apparatus 10 of the vehicle 2 can be presented as the timing for staring the process. For example the floating type remote monitoring apparatus 20 receives an idle reduction instruction signal or a status signal indicating an idle reduction status (S51). The floating type remote monitoring apparatus 20 causes the flying object 3 to return temporarily to the arrival and departure field provided at the vehicle 2 or the like (S52).

With the above-described process, the floating type remote monitoring apparatus 20 can cause the flying object 3 to return on the basis of a signal related to idle reduction in the vehicle 2. This allows a curb on energy consumption associated with flight of the flying object 3 at the time of vehicle stopping.

Return Process Based on Positional Information

Figure 11:
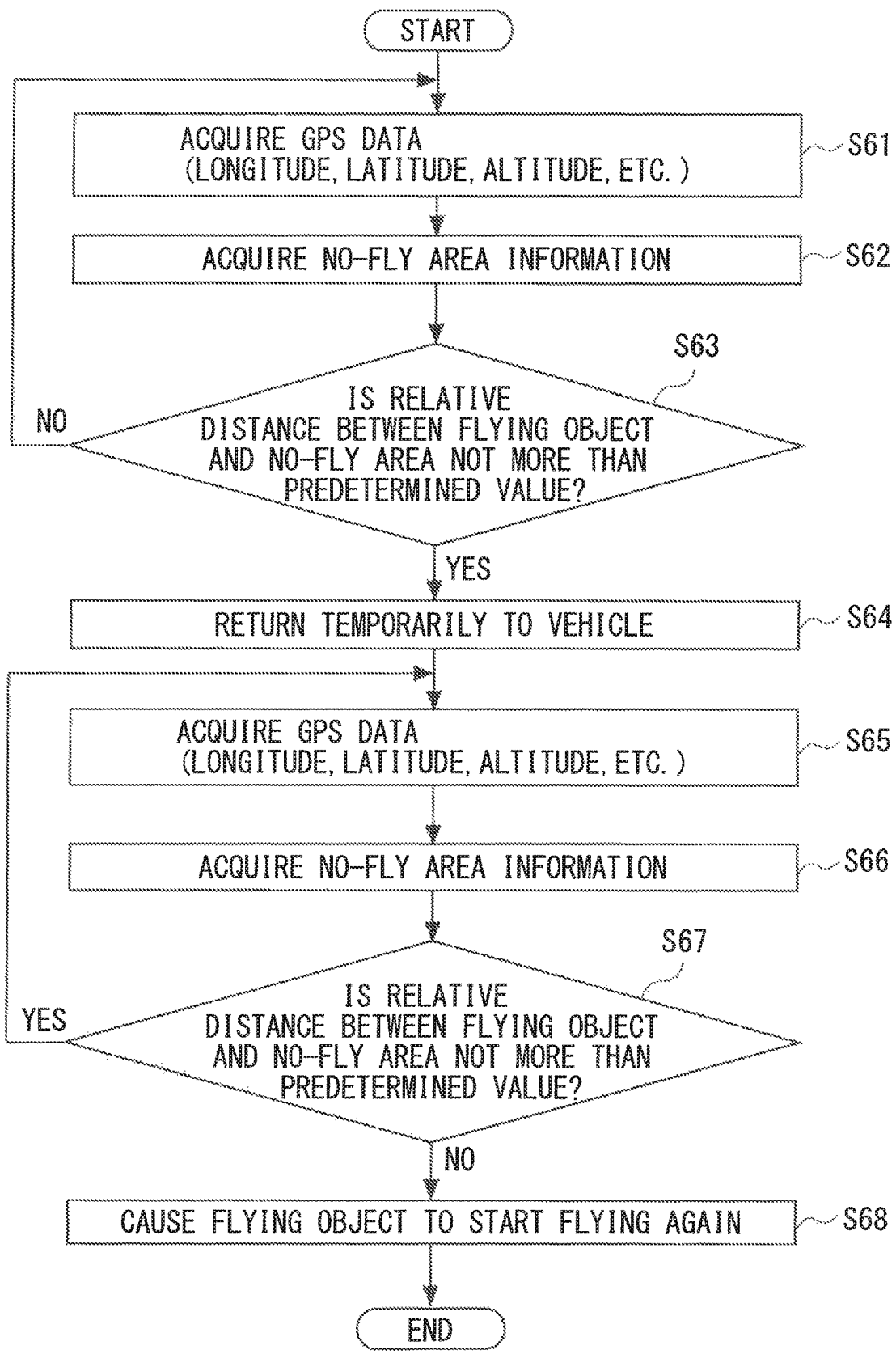
FIG. 11 is a flowchart illustrating one example of a return process based on a no-fly area.

FIG. 11 is a flowchart illustrating one example of a return process based on a no-fly area. In the flowchart illustrated in FIG. 11, the timing of reception of a vehicle signal transmitted from the vehicle surroundings monitoring apparatus 10 of the vehicle 2 can be presented as the timing for stalling the process. For example, the floating type remote monitoring apparatus 20 acquires GPS data (longitude, latitude, and altitude) on the flying object 3 from the GPS unit 22 (S61). The floating type remote monitoring apparatus 20 acquires coordinate information on the no-fly area stored in the map information holding unit 126 (S62). The floating type remote monitoring apparatus 20 then calculates a relative distance between the flying object 3 and the no-fly area and judges whether the calculated relative distance is not more than a predetermined value (S63). The predetermined value here refers to a threshold set in advance for causing the flying object 3 to return. The threshold may be varied so as to correspond to, for example, the flight speed (traveling speed) of the flying object 3.

For example, if the calculated relative distance is more than the predetermined value (NO in S63), the floating type remote monitoring apparatus 20 repeats the processes in S61 to S63. On the other hand, for example, if the calculated relative distance is not more than the predetermined value (YES in S63), the floating type remote monitoring apparatus 20 shifts to a process in S64 and causes the flying object 3 to return temporarily to the arrival and departure field provided at the vehicle 2 or the like.

After the return of the flying object 3, for example, the floating type remote monitoring apparatus 20 acquires GPS data (longitude, latitude, and altitude) on the flying object 3 from the GPS unit 22 (S65). The floating type remote monitoring apparatus 20 acquires coordinate information on the no-fly area stored in the map information holding unit 126 (S66). The floating type remote monitoring apparatus 20 calculates the relative distance between the flying object 3 and the no-fly area and judges again whether the calculated relative distance is not more than the predetermined value (S67).

For example, if the calculated relative distance is not more than the predetermined value (YES in S67), the floating type remote monitoring apparatus 20 repeats the processes in S65 to S67 while the flying object 3 is in a return state. On the other hand, for example, if the calculated relative distance is more than the predetermined value (NO in S67), the floating type remote monitoring apparatus 20 shifts to a process in S68 and causes the flying object 3 to start flying again.

With the above-described process, the floating type remote monitoring apparatus 20 can stop flight in the no-fly area present in the traveling direction. The floating type remote monitoring apparatus 20 can cause the flying object 3 to start flying if the vehicle 2 exits from the no-fly area.

Warning Process

Figure 12:
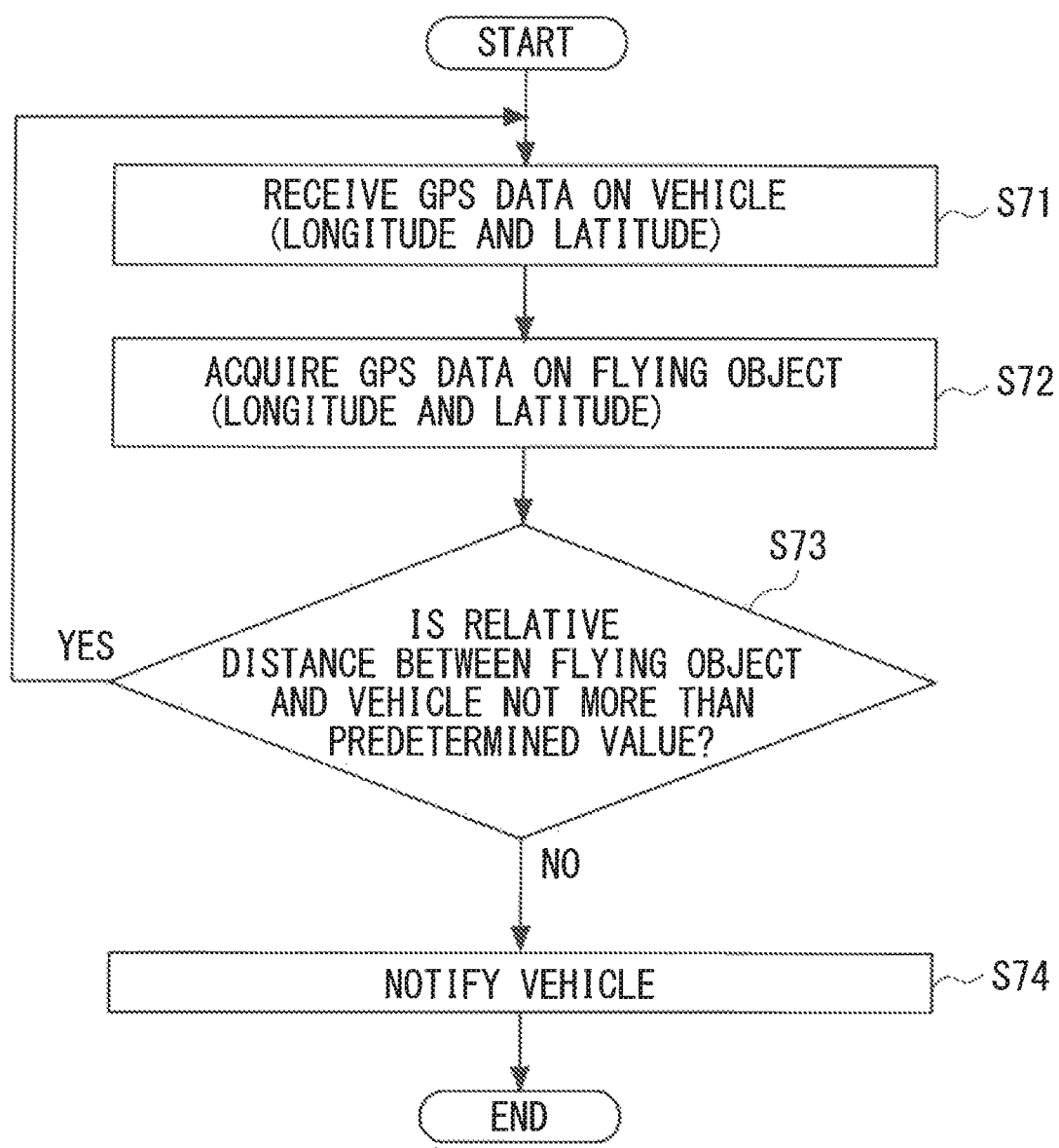
FIG. 12 is a flowchart illustrating one example of a warning process based on a relative distance between a vehicle and a flying object.

FIG. 12 is a flowchart illustrating one example of a warning process based on the relative distance between the vehicle 2 and the flying object 3. In the flowchart illustrated in FIG. 12, the timing of reception of a vehicle signal transmitted from the vehicle surroundings monitoring apparatus 10 of the vehicle 2 can be presented as the timing for starting the process. The floating type remote monitoring apparatus 20 receives GPS data (longitude and latitude) on the vehicle 2 (S71). The floating type remote monitoring apparatus 20 also acquires GPS data (longitude and latitude) on the flying object 3 from the GPS unit 22 (S72). The floating type remote monitoring apparatus 20 calculates the relative distance between the vehicle 2 and the flying object 3 and judges whether the calculated relative distance is not more than a predetermined value (S73). The predetermined value here refers to a threshold set in advance for giving notification of a warning and may be varied so as to correspond to the flight speed (traveling speed) of the flying object 3.

For example, if the calculated relative distance is not more than the predetermined value (YES in S73), the floating type remote monitoring apparatus 20 repeats the processes in S71 to S73. On the other hand, for example, if the calculated relative distance is more than the predetermined value (NO in S73), the floating type remote monitoring apparatus 20 shifts to a process in S74 and notifies the vehicle 2 of a request to reduce the running speed of the vehicle 2.

With the above-described process, the floating type remote monitoring apparatus 20 can give notification of a request to reduce the running speed of the vehicle 2 if the relative distance between the vehicle 2 and the flying object 3 is more than a fixed distance. The vehicle surroundings monitoring apparatus 10 can present a warning as an instruction to reduce the running speed to a driver or a fellow passenger, for example, in a situation where the running speed of the vehicle 2 exceeds the flight speed of the flying object 3 due to an external factor, such as a gust. The warning method is one example of control of a method for presenting information to a passenger.

Process of Recording Shot Image at Time of Shock Detection

Figure 13:
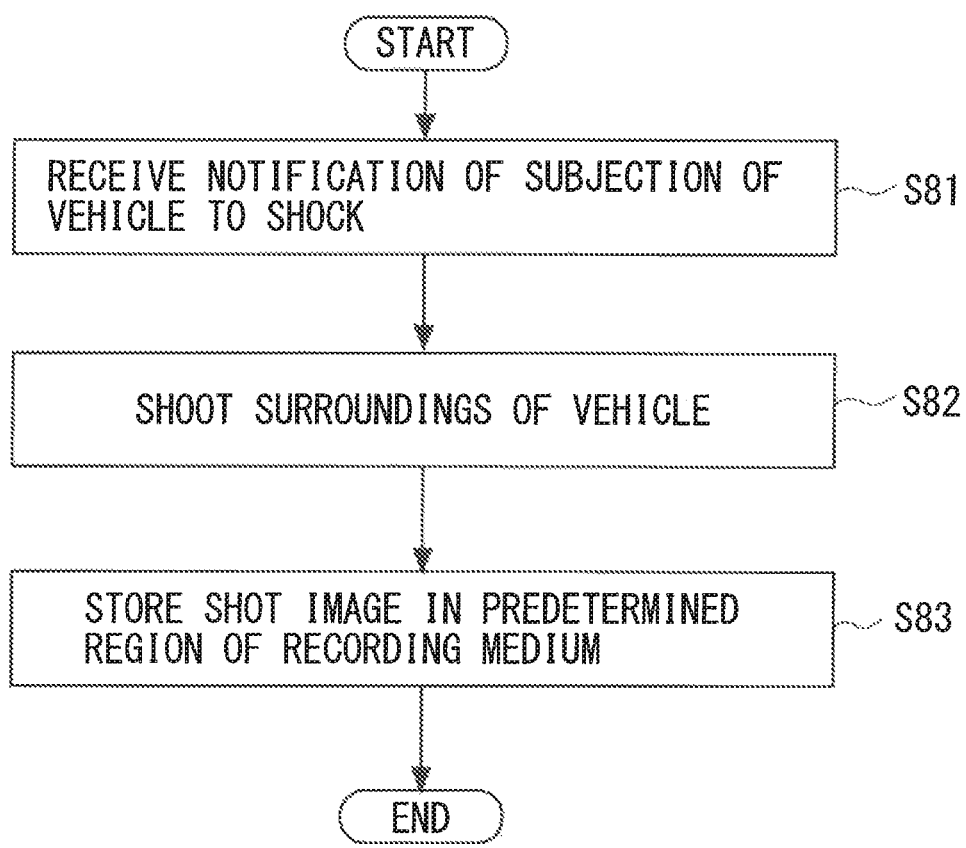
FIG. 13 is a flowchart illustrating one example of a process of recording a shot image at the time of shock detection.

FIG. 13 is a flowchart illustrating one example of a process of recording a shot image at the time of shock detection. In the flowchart illustrated in FIG. 13, the timing of reception of a vehicle signal transmitted from the vehicle surroundings monitoring apparatus 10 of the vehicle 2 can be presented as the timing for starting the process. The floating type remote monitoring apparatus 20 receives information (a change in the acceleration rate of a fixed value or more, airbag deployment, or the like) indicating subjection of the vehicle 2 to shock (S81). The floating type remote monitoring apparatus 20 controls the flight speed of the flying object 3 and changes the shooting direction, the focal length, and the angle of view of the image-taking apparatus 21 to shoot the surroundings of the vehicle 2 (S82). The floating type remote monitoring apparatus 20 instructs the picture storage unit 125 to record a shot image shot by the image-taking apparatus 21 in the particular region of the storage medium. With the above-described process, the floating type remote monitoring apparatus 20 can record a shot image shot from a viewpoint above the vehicle 2 when the vehicle 2 is subjected to shock. The process of recording a shot image at the time of shock detection is one example of control of a method for acquiring information on vehicle surroundings.

As has been described above, the monitoring system 1 according to the present embodiment allows acquirement and presentation of diverse information corresponding to the running status of the vehicle 2 and allows more practical and useful driving assistance using the flying object (drone) 3.

Modifications

The floating type remote monitoring apparatus 20 equipped on the flying object 3 in the monitoring system 1 according to the first embodiment has been described as performing flight control of the flying object 3 and shooting control of the image-taking apparatus 21 on the basis of a vehicle signal. A form of control according to the first embodiment can be applied to, for example, a flying object having a transportation unit which conveys goods, a flying object equipped with weapons, a flying object equipped with an electromagnetic sensor, and the like.

For example, the vehicle surroundings monitoring apparatus 10 may generate a flight control signal and a shooting control signal corresponding to the processes described with reference to FIGS. 5 to 13 on the basis of a vehicle signal and transmit the generated control signals as commands to the floating type remote monitoring apparatus 20. In the monitoring system 1 according to a modification, the flying object 3 is capable of performing shooting control of the image-taking apparatus 21 and flight control of the flying object 3 in accordance with commands from the vehicle surroundings monitoring apparatus 10 which are received via the floating type remote monitoring apparatus 20.

Others: Computer-Readable Recording Medium

A program which causes a computer or any other machine or apparatus (hereinafter referred to as a computer or the like) to implement any of the functions can be recorded in a recording medium readable by a computer or the like. The function can be provided by causing the computer or the like to read and execute the program on the recording medium.

A recording medium readable by a computer or the like here refers to a recording medium, in which pieces of information, such as data and a program, are accumulated electrically, magnetically, optically, mechanically, or chemically and from which the pieces of information can be read by a computer or the like. Ones demountable from a computer or the like among such recording media include, for example, a flexible disk, a magneto-optical disc, a CD-ROM, a CD-R/W, a DVD, a Blu-ray disc, a DAT, an 8-mm tape, and a memory card, such as a flash memory. Recording media fixed in a computer or the like include a hard disk and a ROM. A solid state drive (SSD) can be used both as a recording medium demountable from a computer or the like and as a recording medium fixed in a computer or the like.

The invention claimed is:

1. A ground vehicle surroundings monitoring system comprising:
   a ground vehicle comprising:
      an on-board ground vehicle surroundings monitoring apparatus; and
      a sensor; and
   an unmanned aerial vehicle ("UAV") comprising:
      an image-taking apparatus; and
      a remote ground vehicle surroundings monitoring apparatus;
   wherein the on-board ground vehicle surroundings monitoring apparatus comprises a processor configured to:
      identify a collision of the ground vehicle by detecting, via the sensor, a change in an acceleration rate of the ground vehicle that is equal to or greater than a predetermined value;
      upon identification of the collision, transmit to the remote ground vehicle surroundings monitoring apparatus a control signal that includes an indication of the identified collision;
      acquire, from the UAV, at least one image of the ground vehicle surroundings while controlling flight of the UAV; and
      present the acquired at least one image of the ground vehicle surroundings to a passenger of the ground vehicle in accordance with running conditions of the ground vehicle; and
   wherein the remote ground vehicle surroundings monitoring apparatus comprises a processor configured to:
      receive the control signal from the on-board ground vehicle surroundings monitoring apparatus; and
      upon receipt of the control signal, (i) vary traveling speed of the UAV according to the control signal, (ii) change a focal length of the image-taking apparatus based on the traveling speed of the UAV, (iii) obtain the at least one image of the ground vehicle surroundings, and (iv) record the obtained at least one image in a recording medium.

2. The ground vehicle surroundings monitoring system according to claim 1, wherein the processor of the remote ground vehicle surroundings monitoring apparatus is configured to change an angle of view of the image-taking apparatus based on the traveling speed of the UAV.

3. The ground vehicle surroundings monitoring system according to claim 1, wherein the processor of the remote ground vehicle surroundings monitoring apparatus is configured to change a traveling direction of the UAV based on the control signal transmitted from the on-board ground vehicle surroundings monitoring apparatus and to change a shooting direction of the image-taking apparatus based on the traveling direction of the UAV.

4. The ground vehicle surroundings monitoring system according to claim 1, wherein the processor of the remote ground vehicle surroundings monitoring apparatus is configured to vary an acceleration rate of the UAV and a traveling direction angle of the UAV based on the control signal transmitted from the on-board ground vehicle surroundings monitoring apparatus and to change an orientation of the image-taking apparatus in a direction counteracting an effect of a change in posture associated with the variation of the acceleration rate and the traveling direction angle of the UAV.

5. The ground vehicle surroundings monitoring system according to claim 1, wherein the processor of the remote ground vehicle surroundings monitoring apparatus is configured to cause the UAV to land on a landing area on a surface of the ground vehicle designated for receiving the UAV based on a signal color of a traffic light imaged by the image-taking apparatus.

6. The ground vehicle surroundings monitoring system according to claim 5, wherein the landing area includes a charger that charges a storage battery of the UAV.

7. The ground vehicle surroundings monitoring system according to claim 1, wherein the processor of the remote ground vehicle surroundings monitoring apparatus is configured to cause the UAV to land on a landing area on the ground vehicle designated for receiving the UAV based on a signal indicating idle reduction of the ground vehicle included in the control signal transmitted from the on-board ground vehicle surroundings monitoring apparatus.

8. The ground vehicle surroundings monitoring system according to claim 1, wherein:
   the UAV includes a GPS receiver, and
   the processor of the remote ground vehicle surroundings monitoring apparatus is configured to:
      calculate a relative distance from a no-fly area based on coordinates of the no-fly area included in the control signal transmitted from the on-board ground vehicle surroundings monitoring apparatus and a GPS signal received by the GPS receiver, and
      if the calculated relative distance is not more than a predetermined value, cause the UAV to land on a landing area on a surface of the ground vehicle.

9. The ground vehicle surroundings monitoring system according to claim 8, wherein the processor of the remote ground vehicle surroundings monitoring apparatus is configured to cause the UAV having landed on the landing area to fly when the relative distance exceeds the predetermined value.

10. The ground vehicle surroundings monitoring system according to claim 1, wherein:
    the UAV includes a GPS receiver, and
    the processor of the remote ground vehicle surroundings monitoring apparatus is configured to:
       perform autonomous control such that a flying position of the UAV remains within a predetermined range of the ground vehicle based on a GPS signal included in the control signal transmitted from the on-board ground vehicle surroundings monitoring apparatus and a GPS signal received by the GPS receiver, and
       notify the ground vehicle of a speed reduction request if the flying position falls outside the predetermined range.

11. The ground vehicle surroundings monitoring system according to claim 1, wherein the UAV includes one of a transportation unit, a weapon, and an electromagnetic sensor that collaborates with the ground vehicle.

12. The ground vehicle surroundings monitoring system according to claim 1, wherein the processor of the on-board ground vehicle surroundings monitoring apparatus is further configured to control, based on a speed of the ground vehicle, where the at least one image is to be collected.

13. The ground vehicle surroundings monitoring system according to claim 1, wherein the processor of the on-board ground vehicle surroundings monitoring apparatus is further configured to:
   generate the control signal, which includes at least one of
      (i) a signal indicating speed, an acceleration rate, a yaw rate, a traveling direction, a turn signal lever position, a shift lever position, and idle reduction of the ground vehicle, (ii) a signal indicating collision, (iii) a GPS signal, and (iv) coordinates of a no-fly area for the UAV, and
   transmit the control signal to the UAV at predetermined intervals.

* * * * *